Figure 5:
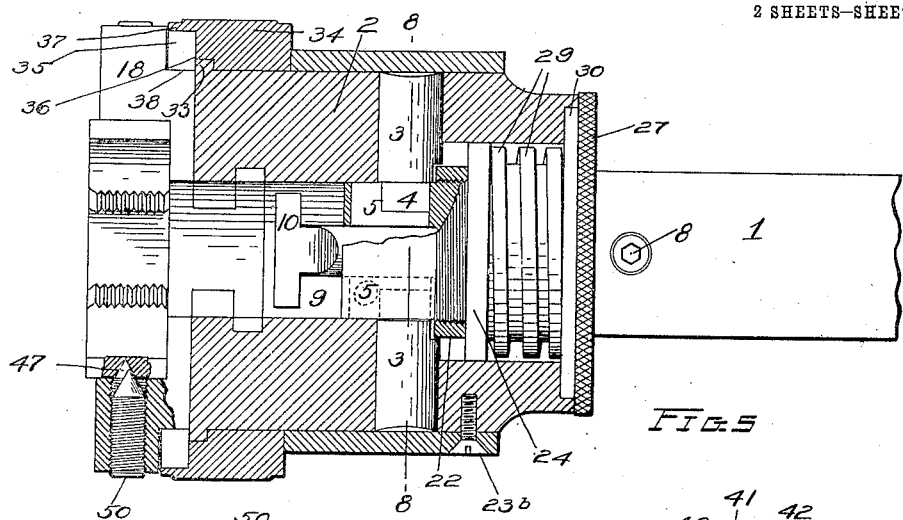

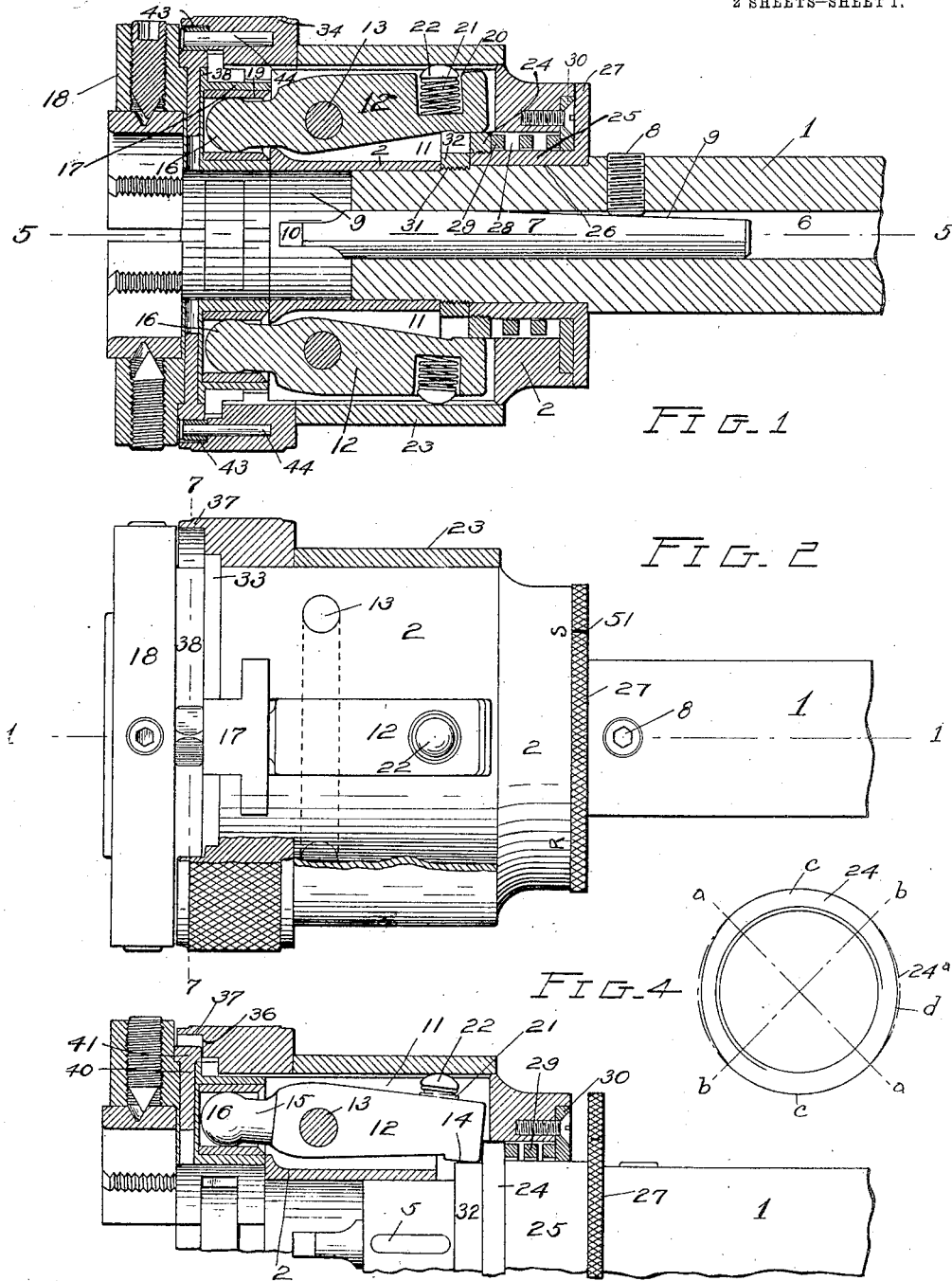

C. F. SCHULTIS.
THREADING DEVICE.
APPLICATION FILED JAN. 19, 1912.

1,108,798.

Patented Aug. 25, 1914.
2 SHEETS—SHEET 2.

Witnesses:
Brennan B. West.
Hugh B. McGill.

Inventor
Chas. F. Schultis
By Hull & Smith
Attys.

UNITED STATES PATENT OFFICE.

CHARLES F. SCHULTIS, OF CLEVELAND, OHIO, ASSIGNOR, BY DIRECT AND MESN. ASSIGNMENTS, TO CHRISTIAN GIRL, OF CLEVELAND, OHIO.

THREADING DEVICE.

1,108,798.

Specification of Letters Patent. Patented Aug. 25, 1914.

Application filed January 19, 1912. Serial No. 672,094.

*To all whom it may concern:*

Be it known that I, CHARLES F. SCHULTIS, a citizen of the United States, residing at Cleveland, in the county of Cuyahoga and State of Ohio, have invented a certain new and useful Improvement in Threading Devices, of which the following is a full, clear, and exact description, reference being had to the accompanying drawings.

This invention relates to threading devices or tools and, while some of the features are applicable to hand-operated devices or tools, the embodiment shown herein is of the power-operated type, wherein the threading device or tool is mounted in a large machine, as a turret-lathe or drill press.

The general objects of the invention are to provide a device of this kind with improved automatically operating means whereby the dies or thread cutters are not only automatically opened or separated when a cut of a predetermined length has been made, but the cutting faces are maintained in substantially parallel relation during such separation.

A still further object of the invention is to provide a tool of this kind with particularly efficient means whereby threads of varying depth may be conveniently and efficiently cut, the change in depth of cut being accomplished by an extremely simple adjusting operation; also to provide an efficient means for automatically closing or bringing to cutting position the threading or die cutting members after they have been automatically separated; also to provide a convenient and efficient driving connection between the threading device as a whole and the shank therefor, which connection will permit of longitudinal movement between these parts; also to provide improved means for securing and adjusting the cutting members or dies in place.

A further and general object of the invention is to provide an improved and simplified construction for automatically opening the threading device.

Figure 6:
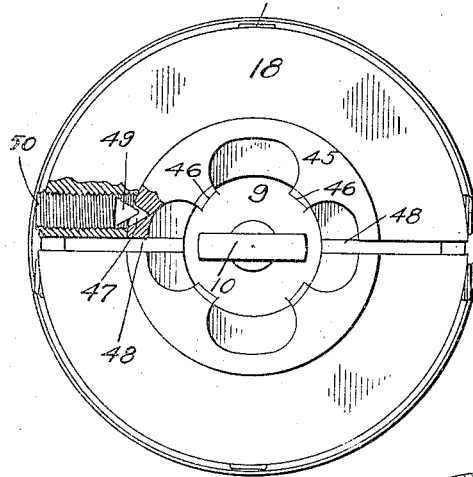
Figure 7:
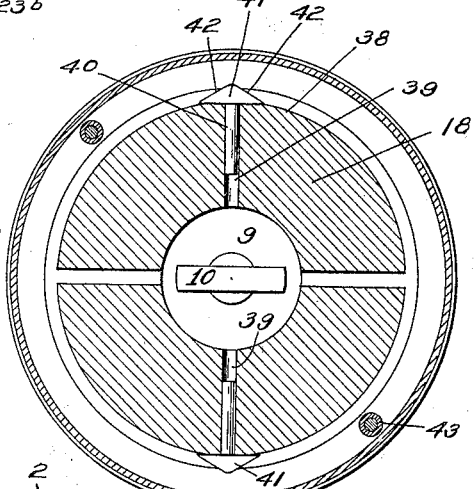
Figure 8:
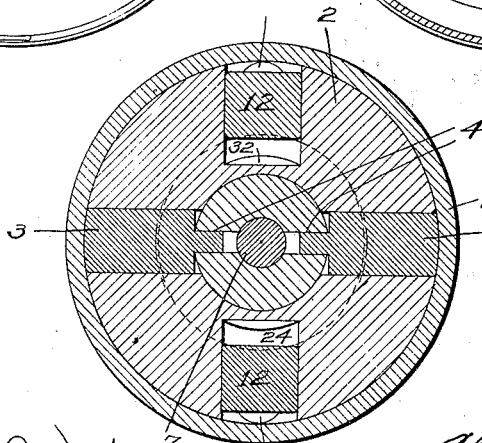

Still further and more generally stated, the invention is comprised by and within the combinations of elements embodied in the claims hereto annexed and illustrated in the drawings forming a part hereof wherein;

Figure 1 represents a longitudinal sectional view taken through a device constructed in accordance with my invention, the section corresponding to the line 1—1 of Fig. 2; Fig. 2 represents an elevation of the device shown in Fig. 1, part of the outer casing being broken away. Fig. 3 represents a sectional detail of a part of the device shown in Fig. 1, illustrating the manner in which the cutting members or dies are opened or separated. Fig. 4 is a somewhat diagrammatic view of the adjusting ring for varying the depth of the threads cut. Fig. 5 is a sectional view corresponding to the line 5—5 of Fig. 1, certain parts being shown in elevation. Fig. 6 is a front elevation of the threading device or tool, parts being broken away; Fig. 7 is a sectional view corresponding to the line 7—7 of Fig. 2, and Fig. 8 a sectional view corresponding to the line 8—8 of Fig. 5.

The threading tool or device shown herein is a die head of the type shown in my copending application filed April 10, 1911, Ser. No. 620,102 and, as illustrated, is adapted to be mounted in a machine in which either the tool or the work is rotated.

Describing by reference characters the various parts illustrated herein, 1 denotes the shank of a tool, said shank supporting a generally cylindrical head 2, which is connected to the shank by means of a plurality of pins 3, the bodies whereof are preferably cylindrical and are mounted in correspondingly shaped radial guides in the tool body, said pins having reduced ends 4 which project into slots 5 in the body of the shank, said slots being of considerably greater length than the projections 4, whereby the head is connected with the shank in such manner as to prevent rotary movement therebetween but permit a relative longitudinal movement therebetween. The purpose of this construction will be explained hereinafter.

The shank is provided with a central bore 6 in which there is mounted a pin 7, said pin being adjustably secured in said bore by means of a screw 8 mounted in the shank and having a flattened inner end adapted to bear against an inclined surface 9 with which said pin is provided. The pin 7 projects into the cylindrical chamber 9 of the tool and is there provided with a T-head 10.

The cylindrical head of the tool or stock is provided with a pair of radial slots 11 projecting thereinto from the outer surface of the head and extending substantially to the front or die-supporting end of the head. In each slot a lever 12 is pivotally supported intermediate of its ends by means of a pin 13. The rear end of each lever is provided with a projection 14 and the front end with a reduced neck 15 having a rounded head 16 thereon. The head 16 projects into a cylindrical opening formed in the T-shaped guide extension 17 of a die-carrier 18, the front portion of the die carrier being preferably in the shape of a semi-cylindrical ring which projects in front of the head 2 of the stock. For the purpose of providing for the wear between the head 16 and the coöperating surface of the die carrier, a liner tube 19 is fitted into the cylindrical aperture provided in guide extension 17, which liner can be conveniently removed and cheaply replaced by another when the parts become worn. At the rear of the pivot 13, and preferably near its rear end, each lever is provided with a recess 20. In this recess there is inserted a spiral spring 21 bearing at one end against the bottom of the recess and at its opposite end against the head 22 of a pin, said head preferably being rounded, as shown. Surrounding the body of the die stock and retaining the levers 12, pins 22 and pins 3 in place is a cylindrical casing 23, said casing being conveniently secured in place by screws 23ᵇ. For the purpose of preventing the rear ends of the levers 12 from being thrown inwardly by the springs 21 and thus separating the die-carrying members, a ring 24 is provided which is normally engaged by the rear ends of these levers. This ring is shown as threaded upon the forward end of a cylindrical collar 25 which is rotatably mounted upon a reduced portion 26 of the shank 1 and is provided with an outwardly projecting flange 27 at its rear end, which flange substantially covers the rear end of the head 2. An annular space 28 is provided in the head 2 immediately surrounding the collar 25 and in this space there is located a heavy coiled spring 29, one end of which bears against the ring 24, and the other against an annular plate 30, which is secured to the head 2, being located within a recess in the rear end of the head and projecting radially into substantial contact with the collar 25, thereby forming an abutment for the opposite end of the spring 29. In front of the reduced portion 26, the shank 1 is provided with a threaded portion 31 to which there is applied a ring 32, said ring being located immediately in front of the ring 24 and being of materially less external diameter than the latter ring. The ring 32 is seated in a recess provided within the head 2, and forms an abutment for the front end of the collar 25.

The casing 23 terminates considerably short of the front of the head 2 and the front end of said head is provided with an outwardly projecting flange 33 between which and the front end of the casing 23 there is provided an annular recess for the reception of a ring 34, said ring being provided with a recess for the flange 33 and with an angular recess 35 located in front of the recess 33 and formed between an outwardly projecting shoulder 36 and a forwardly projecting shoulder 37. In the last recess, each die carrier 18 is provided with a semi-cylindrical extension or ring 38, intermediate between the front of said carrier and the guide extension 17 thereof, and each ring section 38 is provided with bore 39, preferably located equidistant from the ends thereof, there being a pin 40 mounted in each bore and having a head 41, which is substantially wedge-shaped, in order to provide a pair of cam operating faces 42. These operating faces are adapted to be engaged by rollers 43 mounted on pins 44 carried by the collar 34 and projecting into the space 35. It will be apparent that, by rotating the collar 34 relative to the body or head of the tool, the die carriers may be forced inwardly as the rollers 43 ride up either of the inclined surfaces 42. The parts are so proportioned that, when the rollers are on the highest points of the heads 41, the die carriers will each be in its innermost adjusted position.

The dies and die-carriers which I preferably employ are of the type employed in my application referred to hereinbefore. The dies are shown at 45 and are generally semi-cylindrical in shape, each having the cutters 46 thereon. In order to mount and finally retain each die within its seat, I provide each die with a pair of conical recesses 47 formed in the outer cylindrical surface and located closely adjacent to the radially extending faces 48 of the die. These seats are adapted to receive each the conical point 49 of a screw 50, which is mounted within the die carrier, the threaded aperture for the screw being so located with reference to the conical recess 47 that the axis of the screw will be outside of and to the rear of the axis of the recess, whereby the point of the screw tends to engage the rear surface of the recess 47 as well as that portion of said aperture which is remote from the adjacent radial surface 48. A similar screw, designated by like numeral, is provided intermediate between the pair of screws adjacent to the radial faces 48, as will appear from Fig. 5. In this view, the manner in which the point of the screw coöperates with the recess 47 will be apparent, the point of the screw shown as contacting with the rear surface only of the recess 47. By arranging the screws and recesses in the manner described, the dies will be forced rearwardly and outwardly into their seats. Furthermore, the dies may be very conveniently adjusted in their seats by manipulating said screws.

With the parts constructed as illustrated and described, the operation will be as follows:—The pin 7 will be adjusted by means of its inclined surface 9 and the screw 8 in accordance with the length of the thread to be cut upon the work. When the work engages the head 10 of the pin 7, whether the work be fed toward the tool or vice versa, further relative longitudinal movement of the work and tool will be prevented. Assuming that the rotation of the work or tool continues, however, the engagement of the die threads with the threads on the work will produce a backward thrust upon the pin 7 and a forward pull upon the die head. This will cause the head to be pulled forward, compressing the spring 29 between the rings 24 and 30 until the rear ends of the levers 12 will clear the former ring, the slots 5 permitting this relative movement between the head and shank without destroying the driving connection secured by the pins 3. Thereupon the springs 21 will force the rear ends of the levers inwardly until they engage the ring 32, as shown in Fig. 3. Through the sliding connection between the heads 16 and the die carriers, the latter will move outwardly to the position shown in Fig. 3, with the cutting faces in parallel relations. By this construction, the work will be disengaged with a minimum separation of the die carriers and with no liability of binding between the rear threads of the dies and the work. This same separation of the die members will occur where the work does not engage the pin 7 but where the relative feeding movement of the work and tool is suspended without at the same time suspending the relative rotary movement therebetween. In such a case, the engagement of the threads of the dies with the threads on the work will result in pulling the die carriers and head forwardly and allowing the springs 21 to separate said carriers. When it is desired to restore the parts to their original position, it is only necessary to rotate the ring 34 with respect to the tool to cause the rollers 43 to ride up on the hardened heads 41 of the pins 40, which will cause the front ends of the levers to be rocked radially inwardly, moving the rear ends outwardly and out of blocking relation to the ring 24 and allowing the spring 29 to restore the parts to the position shown in Fig. 1.

It is frequently desirable to cut a preliminary shallow thread and a secondary deeper or finishing thread on the same work. My construction lends itself to this operation in a particularly convenient manner. The ring 24, as will appear from Fig. 4, is not a true cylinder on its outer surface but is slightly elliptical, as will appear by reference to the dotted lines 24$^a$, the spaces between which and the full line indicating the amount which the outer surface of the ring is reduced or flattened in the segments between the diametrical lines $a$—$a$ and $b$—$b$, said lines being arranged right-angles to each other. It will be evident that, if the rear ends of the levers 12 are supported on the parts $c$—$c$ of said ring, the dies are adjusted to cut the deepest thread possible and that, as the levers are supported on the parts of said ring, the dies will cut a shallower thread, the shallowest thread being cut when the levers rest upon points located about forty-five degrees from the ends of the lines $a$—$a$ and $b$—$b$. For the purpose of setting this ring, I provide the flange 27 with an index mark, shown at 51 and place upon the adjacent portion of the die head 2 marks R and S, arranged ninety degrees apart. The mark S corresponds to the middle portion of the segment $c$ of the ring 24 and the mark R to the middle portion of the segment $d$. When the index 51 is set at S, the rear ends of the levers will be supported on the most elevated portion of the ring 24 and a "standard" or full-depth cut will be made. By rotating the flange (and ring 25) so as to bring the mark 51 beyond a position half-way between S and R, the ends of the levers will be supported on a lower part of the ring and a thread of less depth will be cut. When the mark 51 is brought into register with the letter R, the rear ends of the levers will be at the extreme inward position and the shallowest or roughest thread will be cut by the dies.

Having thus described my invention, what I claim is:

1. In a device of the character specified, the combination of a shank, a rotatably adjustable collar mounted upon said shank, a ring carried by said collar, a die head mounted in said shank and having an inwardly directed abutment surrounding said collar at the rear of said ring and forming a spring-receiving space with said ring, a spring in said space, levers pivoted to said head and having their rear ends normally in engagement with said ring, springs tending to force the rear ends of the levers inwardly, and connections between the front ends of the levers and the die carriers, said ring being of different thicknesses from point to point.

2. In a device of the character specified, the combination of a shank, a ring mounted upon said shank, a die head slidably mounted on said shank and having an inwardly directed abutment forming a spring receiving space with said ring, a spring in said space, levers pivoted to said head, springs tending to force the rear ends of the levers inwardly, and connections between the front ends of the levers and the die carriers, said ring forming an abutment for receiving the rear ends of said levers and preventing their inward movement while said die head is in rearward position.

3. In a device of the character specified, the combination of a shank having a reduced cylindrical front end, a ring threaded upon said shank at the rear of such reduced front end, a collar mounted upon said shank at the rear of said ring and adapted to abut against the same, a ring threaded upon the front end of said collar and projecting outwardly beyond the first ring, an outwardly projecting flange carried by said collar at the rear of the ring thereon, a head mounted upon the front end of the shank and having at its rear end an inwardly or radially extending ring surrounding said collar at the rear of the ring thereon, a spring interposed between the two last mentioned rings, levers pivoted to said head and having their rear ends normally engaged by the ring on said collar, springs tending to force the rear ends of said levers inwardly, and die carriers connected to the front ends of said levers.

4. In a device of the character specified, the combination of a shank, a ring upon said shank, a collar mounted upon said shank at the rear of said ring and adapted to abut against the same, a ring threaded upon said collar and projecting outwardly beyond the first ring, a head mounted upon the shank and having at its rear end an inwardly or radially extending ring surrounding said collar at the rear of the ring thereon, a spring interposed between the two last mentioned rings, levers pivoted to said head and having their rear ends normally engaged by the ring on said collar, springs tending to force the rear ends of said levers inwardly, and die carriers connected to the front ends of said levers.

5. In a device of the character specified, the combination of a head having radially extending guides therein, die carriers mounted in said guides, each carrier having inserted thereinto a pin provided with a head having reversely inclined surfaces, a ring rotatably mounted on the head and extending over said carriers, pins mounted in said ring and overhanging said carriers, rollers on said pins, and yielding means for moving said carriers outwardly in their guides.

6. In a device of the character specified, the combination of a head having radially extending guides therein, die carriers mounted in said guides, each carrier having inserted thereinto a pin provided with a head having an inclined surface, a ring rotatably mounted on the body and extending over said carriers, pins mounted in said ring and overhanging said carriers, and yielding means for moving said carriers outwardly in their guides.

In testimony whereof, I hereunto affix my signature in the presence of two witnesses.

CHARLES F. SCHULTIS.

Witnesses:
 HAROLD E. SMITH,
 BRENNAN B. WEST.